US007708435B2

(12) United States Patent
Watanabe

(10) Patent No.: US 7,708,435 B2
(45) Date of Patent: May 4, 2010

(54) VEHICLE ILLUMINATION DEVICE, VEHICLE ILLUMINATION CONTROL METHOD AND RECORDING MEDIUM STORING A VEHICLE ILLUMINATION CONTROL PROGRAM

(75) Inventor: Shinya Watanabe, Seto (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 184 days.

(21) Appl. No.: 11/978,598

(22) Filed: Oct. 30, 2007

(65) Prior Publication Data

US 2008/0101077 A1 May 1, 2008

(30) Foreign Application Priority Data

Oct. 31, 2006 (JP) ............................. 2006-296344

(51) Int. Cl.
*B60Q 1/04* (2006.01)
(52) U.S. Cl. ........................................ 362/466; 362/465
(58) Field of Classification Search ................. 362/276, 362/464, 465, 466, 538; 382/104; 250/205
See application file for complete search history.

(56) References Cited

U.S. PATENT DOCUMENTS

| 6,861,809 | B2 | 3/2005 | Stam | |
|---|---|---|---|---|
| 2003/0137849 | A1* | 7/2003 | Alden | 362/466 |
| 2006/0146552 | A1* | 7/2006 | Shaffer | 362/465 |

FOREIGN PATENT DOCUMENTS

| EP | 0 971 829 | 11/2001 |
|---|---|---|
| JP | 61-285153 | 12/1986 |
| JP | 4-73725 | 3/1992 |
| JP | 7-186814 | 7/1995 |
| JP | 8-238979 | 9/1996 |
| JP | 11-321444 | 11/1999 |
| JP | 2000-62522 | 2/2000 |
| JP | 2005-164482 | 6/2005 |
| JP | 2006-21631 | 1/2006 |
| JP | 2007-076428 | 3/2007 |
| JP | 2007-76429 | 3/2007 |

OTHER PUBLICATIONS

Office Action from the German Patent Office for DE 10 2007 051 891.0-56 dated Jan. 29, 2010.

* cited by examiner

*Primary Examiner*—Y My Quach Lee
(74) *Attorney, Agent, or Firm*—Finnegan, Henderson, Farabow, Garrett & Dunner, LLP

(57) ABSTRACT

In light that is irradiated from a front light of a vehicle illumination device, a portion thereof is modulated to include a light signal, and a camera captures light from the front of the vehicle. The vehicle illumination device identifies luminance point(s) in the captured images of the camera, and also detects for the light signal, and extracts the luminance point(s) in the captured images other than the luminance point(s) with the detected light signal. The vehicle illumination device identifies segmented region(s) in the light distribution range of the front light that correspond to the extracted luminance point (s), and control is undertaken of the light distribution such that the identified segmented regions are made in a non-illuminating state, and the segmented regions other than those identified are illuminated. By doing so, control of the light distribution for light that is irradiated from the vehicle itself may be prevented.

9 Claims, 9 Drawing Sheets

| FRONT LIGHT SEGMENTED REGION NO. | LED LIGHT SOURCE NO. |
|---|---|
| 1 | 1~8 |
| 2 | 9~12 |
| 3 | 13~15 |
| 4 | 16 |
| 5 | 17 |
| 6 | 18, 19 |
| 7 | 20~22 |
| 8 | 23~27 |

38

VEHICLE ILLUMINATION DEVICE, VEHICLE ILLUMINATION CONTROL METHOD AND RECORDING MEDIUM STORING A VEHICLE ILLUMINATION CONTROL PROGRAM

CROSS-REFERENCE TO RELATED APPLICATION

This application claims priority under 35 U.S.C. 119 from Japanese Patent Application No. 2006-296344, the disclosure of which is incorporated by reference herein.

BACKGROUND OF THE INVENTION

1. Field of the Invention

The present invention relates to a vehicle illumination device, a vehicle illumination control method, and a vehicle illumination control program, and in particular to a vehicle illumination device, a vehicle illumination control method and a vehicle illumination control program for controlling the light distribution of a vehicle light such as a front light or the like.

2. Description of the Related Art

Technology for a vehicle illumination device for controlling the light distribution of a vehicle light such as a front light or the like has been proposed in, for example, Japanese Patent Application Laid-Open (JP-A) No. 2006-21631.

The technology proposed in JP-A No. 2006-21631 is provided with: plural light sources for forming a predetermined light distribution pattern that includes overall a main light distribution portion and a peripheral light distribution portion, which respectively illuminate different regions; a camera for light capture in the forward direction from a vehicle; a dangerous object determining unit for determining objects that are of danger to the vehicle on the basis of the images that have been captured by the camera; and a light source control unit for changing the direction of light from plural light sources to shine on a dangerous object when a dangerous object has been determined by the dangerous object determining unit to be outside of the main light distribution portion.

Furthermore, in the technology described in JP-A No. 2006-21631, the brightness of headlights of an oncoming vehicle are detected from the image of the camera, and by lowering the brightness of the light sources in the light distribution pattern that are facing toward the oncoming vehicle lane side, the glare light toward an oncoming vehicle is reduced.

However, in the technology described in JP-A No. 2006-21631, when the headlights of an oncoming vehicle are being detected from the images of the camera, light that has been irradiated from the vehicle itself, which has been reflected from reflective objects such as mirrors and the like is detected, and this light might be determined falsely as being the headlights of an oncoming vehicle, and in such a case light distribution control would be carried out for light from the vehicle itself.

SUMMARY OF THE INVENTION

The present invention is made in the light of the above problem, and an object of the present invention is to prevent light distribution control in response to light that has been irradiated from the vehicle itself.

In order to address the above problem a first aspect of the present invention is provided with: a vehicle illumination device including: a vehicle illumination unit having a light distribution that can be modified; a light receiving unit that receives light from a vehicle's surroundings; a determination unit that determines, on the basis of the results of the light received by the light receiving unit, whether or not the light is reflected light from light that has been irradiated from the vehicle illumination unit; a controller that controls the light distribution of the vehicle illumination unit such that when a determination has been made by the determination unit that the light is not reflected light from light that has been irradiated from the vehicle illumination unit, light that is irradiated from the vehicle illumination unit in the direction of the light received by the light receiving unit is either reduced or made non-illuminating.

According to the first aspect of the invention, the vehicle illumination unit is divided into plural light distribution regions and the light distribution may be modified for each of the light distribution regions. The vehicle illumination unit may, for example, be applied to a vehicle front light. Furthermore, the following may, for example, be applied to the vehicle illumination unit: plural light sources of LED light sources, provided so as to enable division into segmented regions according to the respective light sources; light modulation elements of a DMD (Digital Micromirror Device) and/or liquid crystal elements, provided for use in enabling division of the light from a light source thereby; or provided with shutters or the like for use in enabling division of the light.

The light receiving unit receives light from the vehicles surroundings. Namely, the light receiving unit receives light that is irradiated from vehicles around the vehicle itself (such as an oncoming vehicle).

Furthermore, in the determination unit, determination is performed on the basis of the results of the received light of the light receiving unit of, for example, whether or not light is reflected light from light that has been irradiated from the vehicle illumination unit of the vehicle itself, and in the controller control, control is performed of the light distribution of the vehicle illumination unit such that if the determination has been made by the determination unit that the light is not reflected light from light that has been irradiated from the vehicle illumination unit, light that is irradiated (from the vehicle illumination unit) in the direction of the (so determined) light received by the light receiving unit, is either reduced in light or made non-illuminating. For example, the light received by the light receiving unit also detects reflected light from light that is irradiated from the vehicle illumination unit of the vehicle itself and has been reflected from a mirror on the road, a guardrail of the like, but it is determined by the determination unit as to whether or not the light is reflected light from light that has been irradiated from the vehicle illumination unit of the vehicle itself, and when the light is not reflected light from light that has been irradiated from the vehicle illumination unit of the vehicle itself, the controller controls the light distribution of the vehicle illumination unit such that light, which is irradiated (from the vehicle illumination unit) in the direction of the (so determined) light received by the light receiving unit, is either reduced in light or made non-illuminating. Therefore, light distribution control may be prevented in response to light that has been irradiated from the vehicle itself. When the light distribution is being controlled so as to be made non-illuminating, for example, the light may be made non-illuminating by the light being irradiated in the direction of the light received by the light receiving unit being blocked, the light source(s) corresponding thereto may be switched off, or the optical axis thereof may be moved.

The determination unit may include an irradiation unit that irradiates a predetermined light signal, and the determination by the determination unit, as to whether or not light is reflected light from light that has been irradiated from the vehicle illumination unit, may be made by detecting the light signal that has been irradiated by the irradiation unit, based on the results of the received light by the light receiving unit. By doing so it is possible to determine whether or not light is reflected light from light that has been irradiated by the vehicle illumination unit of the vehicle itself, based on the presence or absence of the light signal and the contents of the light signal. When this is carried out the irradiation unit may, for example, be configured so as to irradiate as the predetermined light signal a light signal that includes an identification signal for identifying the vehicle itself. Furthermore, when the light sources of the vehicle illumination unit includes LED light sources, the light signal may be irradiated by the irradiation unit controlling the driving of the LED light sources. Light modulation is easily carried out by using LED light sources, and the light sources of the vehicle illumination unit may be used, and such a configuration is beneficial in terms of cost and mounting area when, for example, compared to a configuration in which the irradiation unit is a separate body to that of the vehicle illumination unit.

Alternatively, the determination unit may be configured to include a switching section that switches the illumination state of the vehicle illumination unit, and the determination as to whether or not light is reflected light from light that has been irradiated from the vehicle illumination unit may be made by detecting the switching that has been made by the switching section to the illumination state. For example, the switching section may switch the illumination state by carrying out switching off and on of the vehicle light, by swinging the optical axis thereof, or the like, and the determination unit may determine whether or not light is reflected light that has been irradiated by the vehicle illumination unit of the vehicle itself from these illumination states.

Also, when the switching section switches the illumination state and determines whether or not light is light that has been irradiated by the vehicle illumination unit, the vehicle illumination unit may be provided with plural light sources, and the switching section may switch the illumination state of a portion of the light sources from the plural light sources. By doing so, since the illumination state of a portion of the light sources is switched, the illumination state of the other light sources may be left unchanged, and so problems due to switching of the illumination state (such as, for example, a reduction in visibility due to switching off the light sources) may be reduced.

The controller, on the other hand, may include a luminance point identification section, identifying luminance point(s) on the basis of the results of the received light by the light receiving unit; and a luminance point extraction section, that, on the basis of the results of the determination by the determination unit, extracts luminance point(s) that have been identified by the luminance point identification section which are other than the luminance point(s) corresponding to reflected light from light that has been irradiated from the vehicle illumination unit, and the light distribution of the vehicle illumination unit may be controlled such that light that is irradiated in the direction of the luminance point(s) extracted by the luminance point extraction section is reduced in light, or made non-illuminating. Namely, since there is a high likelihood that there is a driver or other person in the vicinity of the luminance points that have been extracted by the luminance point extraction section, by the controller controlling the light distribution of the vehicle illumination unit such that light that is irradiated in the direction of the luminance point(s) extracted by the luminance point extraction section is reduced in light or made non-illuminating, the glare light to oncoming vehicles or the like may be suppressed. It should be noted that, when there are plural luminance points that have been extracted by the luminance point extraction section, the controller may control the light distribution of the vehicle illumination unit for regions that correspond to the brightest of the luminance points. For example, when light has been received by the light receiving unit that is light that has been reflected from mirrors on the road, guardrails of the like, the brightness of the light that has been irradiated from the light source becomes darker due to dispersion and attenuation during spatial migration, and so by carrying out light distribution control of the vehicle illumination unit for the brightest light, it becomes possible to prevent light distribution control in response to reflected light that is light that has been irradiated from an oncoming vehicle (reflected by a mirror on the road or a guardrail or the like). Or, the controller may control the light distribution of the vehicle illumination unit such that, when there are plural luminance points that have been extracted by the luminance point extraction section, light that is irradiated in the direction of the brightest two luminance points therefrom is reduced in light, or made non-illuminating.

A second aspect of the present invention is a vehicle illumination control method including: receiving light from a vehicle's surroundings; determining, on the basis of the results of the received light, whether or not the light is reflected light from light that has been irradiated from an illumination unit of the vehicle, the illumination unit having a light distribution that can be modified; controlling the light distribution of the vehicle illumination unit such that when the determination has been made by the determination unit that the light that has been received is not reflected light from the light that has been irradiated from the vehicle illumination unit, light that is irradiated from the vehicle illumination unit in the direction of the received light is either reduced or made non-illuminating.

In the second aspect of the invention, light from a vehicle's surroundings is received in the light receiving step. Namely, in the light receiving step, light irradiated from vehicle(s) around the vehicle itself (from an oncoming vehicle, for example) is received.

Furthermore, in the determining step, on the basis of the results of the received light, determination is made, for example, as to whether or not light is reflected light from light that has been irradiated from a vehicle illumination unit of the vehicle itself, and in the controlling step, when the determination has been made in the determining step that light is not reflected light from light that has been irradiated from the vehicle illumination unit, the light distribution of the vehicle illumination unit is controlled such that light that is irradiated from the vehicle illumination unit in the direction of the so determined light received in the light receiving step is either reduced in light or made non-illuminating. For example, the light received in the light receiving step also includes detected reflected light from light that is irradiated from the vehicle illumination unit of the vehicle itself and has been reflected from a mirror on the road, a guardrail of the like, but it is determined in the determination step as to whether or not the light is reflected light from light that has been irradiated from the vehicle illumination unit of the vehicle itself, and when the light is not reflected light from light that has been irradiated from the vehicle illumination unit of the vehicle itself, in the control step the light distribution of the vehicle illumination unit is controlled such that light that is irradiated from the vehicle illumination unit in the direction of the so determined light received in the light receiving step, is either reduced in light or made non-illuminating. Therefore, light distribution control may be prevented in response to light that has been irradiated from the vehicle itself. When the light distribution is being controlled so as to be made non-illuminating, for example, the light may be made non-illuminating by the light being irradiated in the direction of the light received in the light receiving step being blocked, the light source(s) corresponding thereto may be switched off, or the optical axis may be moved.

In the vehicle illumination control method of the second aspect, the vehicle illumination control method may be stored as a program on an information recording medium.

The present invention, as explained above, whether or not light is reflected light that has been irradiated by the vehicle illumination unit of the vehicle itself is determined, when it is not light that has been irradiated from the vehicle illumination unit of the vehicle itself then, by controlling the light distribution of the vehicle illumination unit, it is possible to carry out light distribution control in response to light irradiated that is not from the vehicle itself, with the effect being exhibited that light distribution control may be prevented in response to light that has been irradiated from the vehicle itself.

DETAILED DESCRIPTION OF THE INVENTION

Figure 1:
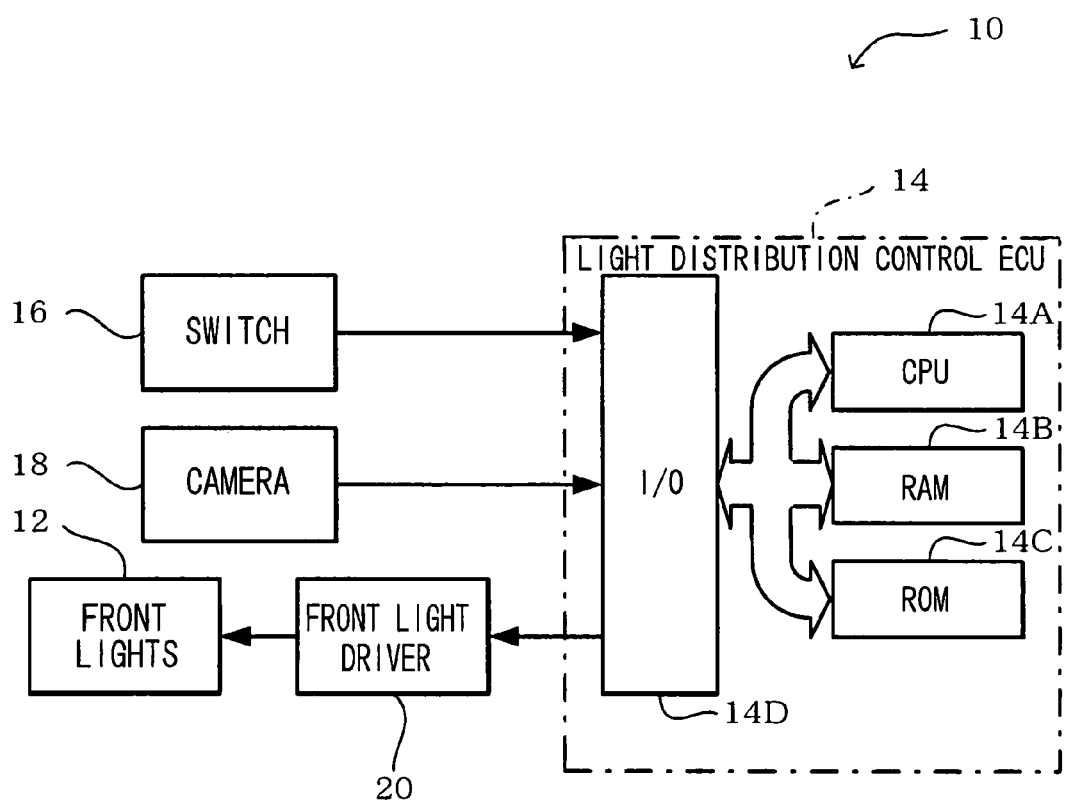
FIG. 1 is a block diagram showing a configuration of a vehicle illumination device according to an exemplary embodiment of the present invention.

Explanation will now be given of the details of one exemplary embodiment of the present invention, with reference to the figures. FIG. 1 is a block diagram showing a configuration of a vehicle illumination device according to an exemplary embodiment of the present invention.

In a vehicle illumination device 10 according to an exemplary embodiment of the present invention, as shown in FIG. 1, a front light 12 that have been provided to a vehicle are connected to a light distribution control ECU 14, and illumination and switching off of the front light 12 is controlled by the light distribution control ECU 14.

In the present exemplary embodiment, the light distribution control ECU 14 carries out light distribution control such that light is not irradiated from within the light distribution region of the front light 12 to a region that corresponds to a luminance point of an oncoming vehicle. Further, in the present exemplary embodiment, for light from within the light distribution region of the front light 12 that is incident on a region that corresponds to a luminance point of an oncoming vehicle, for example, light distribution control is carried out such that light is not irradiated therefrom; however, light distribution control may be carried out so as to give reduced light rather than no light. Furthermore, when the region corresponding to the luminance point of an oncoming vehicle is being made non irradiating or reduced in light, the region corresponding to the luminance point of an oncoming vehicle may be made non irradiating, or reduced in light irradiation, by: blocking light irradiated to the region corresponding to the luminance point of an oncoming vehicle, switching off light source(s) irradiating light thereto; or moving the optical axis of light irradiated to the region corresponding to the luminance point of an oncoming vehicle.

The light distribution control ECU 14 is configured with a CPU 14A, a RAM 14B, a ROM 14C and an I/O 14D.

In the ROM 14C of the light distribution control ECU 14 there is recorded a table for carrying out light distribution control of the front light 12, and a program for executing a light distribution control routine, described later, and the like. The RAM 14B is used as the memory for carrying out various types of processing carried out by the CPU 14A.

A switch 16, a camera 18 and a front light driver 20 are connected to the I/O 14D, and the operation state of the switch 16 and the results of image capture to the vehicle front direction by the camera 18 are input to the light distribution control ECU 14 thereby.

The switch 16 instructs on/off of the front light 12 and also instructs low-beam or high-beam, and the instructed results are output to the light distribution control ECU 14. Furthermore, the camera 18 captures an image to the vehicle front direction and the image capture results are output to the light distribution control ECU 14.

The light distribution control ECU 14 then controls the front light driver 20 according to the state of the switch 16, and illumination of the front light 12 is carried out, and also, based on the image capture of the camera 18, the luminance point of an oncoming vehicle is detected, and the light distribution of the front light 12 is controlled such that the region corresponding to the luminance point of an oncoming vehicle is made non irradiating. It should be noted that, in the present exemplary embodiment, the luminance point is detected by the camera 18, however there is no limitation thereto, and various light receiving sensors may be applied.

Figure 2:
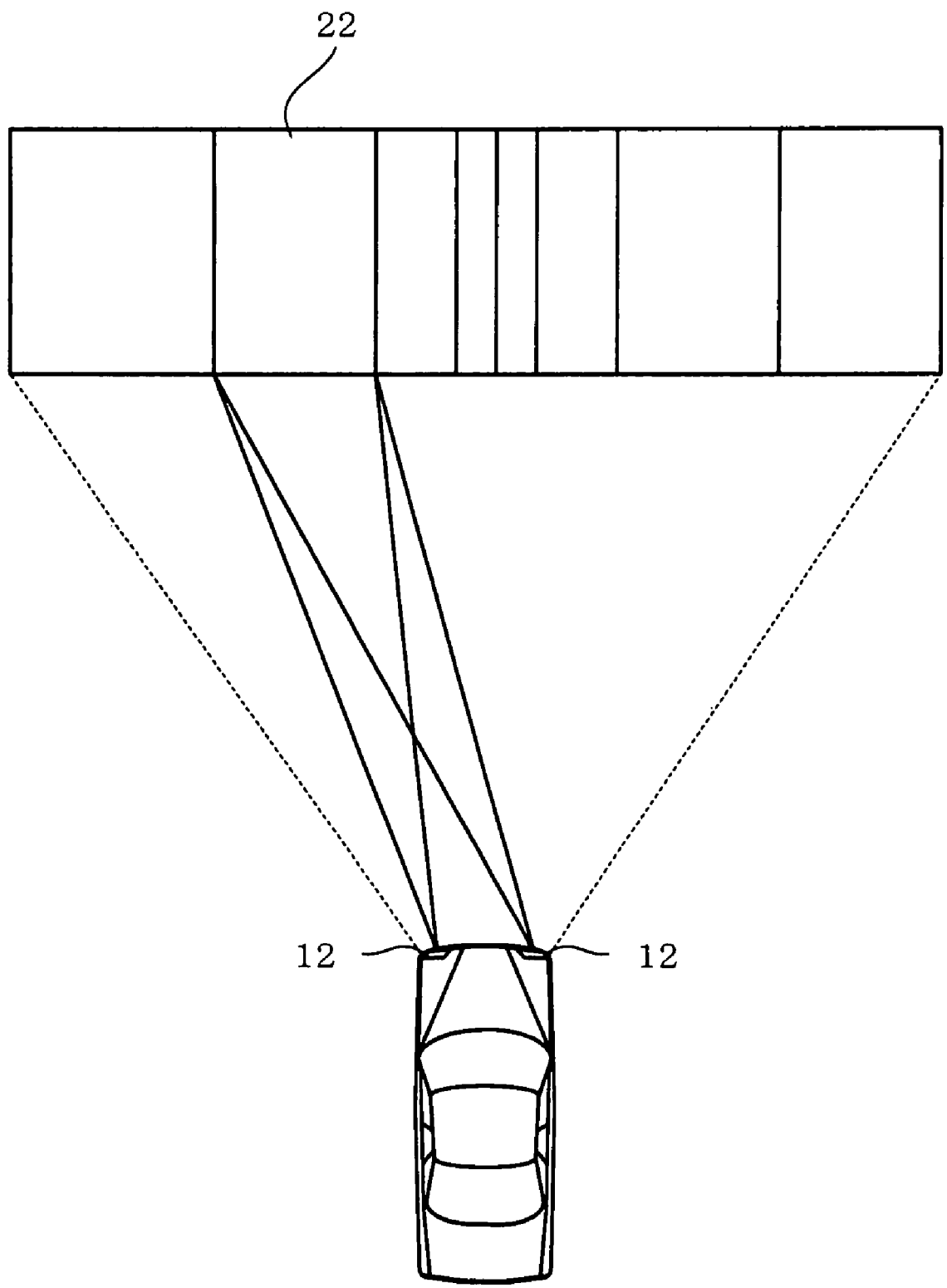
FIG. 2 is a diagram for explaining segmented regions of the light distribution range from the front lights in a vehicle illumination device according to an exemplary embodiment of the present invention.

There are two of the front lights 12 provided at the front portion of a vehicle, and, as shown in FIG. 2, the light distribution region from the front lights 12 is divided into plural regions in the vehicle width direction, and since the irradiation or non irradiation can be controlled for each of these segmented regions 22, light distribution for each of the segmented regions may be varied and the irradiation or non irradiation of each of the segmented regions may be controlled by the light distribution control ECU 14.

Figure 3A:
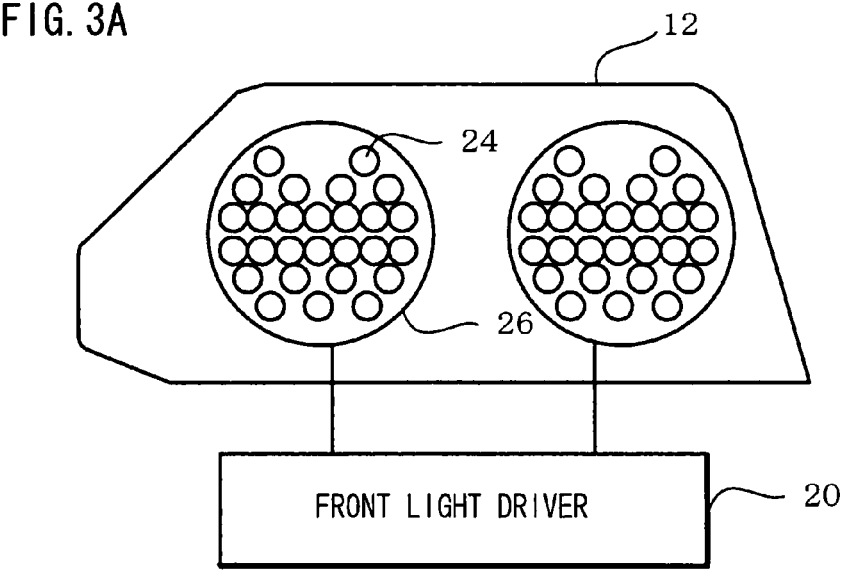
FIGS. 3A, 3B and 3C are diagrams showing examples of front lights to which the vehicle illumination device of an exemplary embodiment of the present invention can be applied.
Figure 3B:
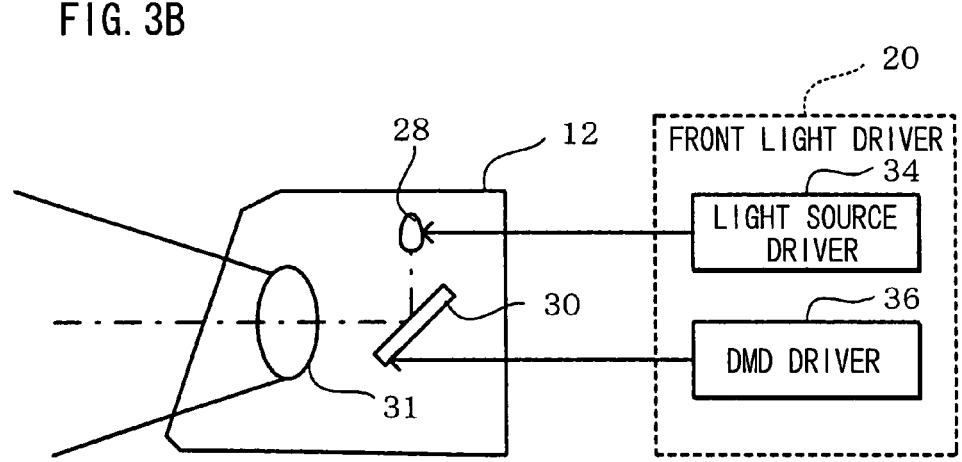

FIG. 3A, 3B are diagrams showing examples of front lights to which the vehicle illumination device 10 of an exemplary embodiment of the present invention can be applied.

The front light 12 may, for example, be one in which plural LED light sources 24 are provided, as shown in FIG. 3A, and irradiation or non irradiation of light to each of the segmented regions 22 shown in FIG. 2 may be carried out by control by switching on or switching off the plural LED light sources 24. In FIG. 3A an example is shown of a front light in which two LED lamps 26 are provided, each of the lamps being provided with plural LED light sources 24, and, for example, use thereof may be selectively made, with one of the LED lamps 26 being used for low-beam and the other of the LED lamps 26 being used for high-beam.

Figure 3C:
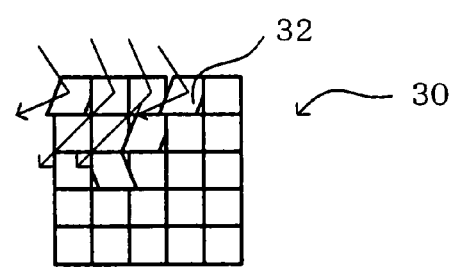

Also, applicable as the front light 12 is one in which, as shown in FIG. 3B, light from one light source 28 is reflected by a DMD (Digital Micromirror Device) 30, and irradiation to the vehicle front direction is through a lens 31. The DMD 30 is provided with plural micro mirrors 32, as shown in FIG. 3C, and the DMD 30 is a device in which the rotation may be controlled of each of the micro mirrors 32. Namely, the front light driver 20 may be provided with a light source driver 34 that switches on and off the light source 28 and with a DMD driver 36 that drives the rotation of each of the micro mirrors 32 of the DMD 30, and control of irradiation or non irradiation of light to each of the segmented regions shown in FIG. 2 may be controlled by controlling the rotation of each of the micro mirrors 32 of the DMD 30 with the DMD driver 36.

It should be noted that, in the present exemplary embodiment, explanation will be given of a front light 12 provided with plural LED light sources 24. Also, it should be noted that the front light 12 is not limited to configurations as described above, and, for example, it could be one with a configuration with plural shutters or the like that shut out light radiating in the vehicle front direction from a single light source, with the size of each of the shutters corresponded to the segmented regions, with light being able to be switched on or switched off for each of the segmented regions shown in FIG. 2. Or, in place of the DMD 30, a liquid crystal element or the like may be used as a light modulating element other than the DMD 30.

Figures 4A, 4B:
FIG. 4A is a diagram for explaining the segmented regions of the light distribution region from the front light in a vehicle illumination device according to an exemplary embodiment of the present invention.
FIG. 4B is a diagram showing correspondence relationship data of light sources to segmented regions.

FIG. 4A is a diagram for explaining the segmented regions of the front light 12 in a vehicle illumination device according to an exemplary embodiment of the present invention.

The segmented pattern of the segmented regions of the front light 12 according to an exemplary embodiment of the present invention are set, as shown in FIG. 4A, such that the division width of the segmented regions at substantially the central portion in the vehicle width direction is shorter in the vehicle width direction than that of the vehicle width direction end portions, and set such that, on progression toward the outside in the vehicle width direction, the segmented regions get gradually longer in the vehicle width direction.

Furthermore, in the front light 12, the plural LED light sources 24 corresponding to each of the segmented regions are set in advance, and turning on or off of each of the segmented regions is carried out by selectively turning on or off the plural LED light sources 24.

For example, in the present exemplary embodiment, as shown in FIG. 4B: the LED light sources 24 for the No. 1 segmented region are corresponded to the LED light sources No. 1 to 8; the LED light sources 24 for the No. 2 segmented region are corresponded to the LED light sources No. 9 to 12; the LED light sources 24 for the No. 3 segmented region are corresponded to the LED light sources No. 13 to 15; the LED light sources 24 for the No. 4 segmented region are corresponded to the LED light source No. 16; the LED light sources 24 for the No. 5 segmented region are corresponded to the LED light source No. 17; the LED light sources 24 for the No. 6 segmented region are corresponded to the LED light sources No. 18, 19; the LED light sources 24 for the No. 7 segmented region are corresponded to the LED light sources No. 20 to 22; and the LED light sources 24 for the No. 8 segmented region are corresponded to the LED light sources No. 23 to 27. Then, since light irradiation or non irradiation of each of the segmented regions can be controlled by the illumination or non illumination of the LED light sources 24 corresponding to the segmented regions, a light source-segmented region relationship table 38 of the correspondences shown in FIG. 4B is recorded to the ROM 14C or the like, and by controlling the illumination using this light source-segmented region relationship table 38, the illumination or non illumination of the front light 12 may be undertaken for each of the regions.

It should be noted that, in the present exemplary embodiment, the segmented regions are determined by the numbers of the LED light sources 24, however, there is no limitation thereto, and, for example, the size of the segmented regions may be determined by the size of lenses or light sources, or characteristics thereof, and the like.

First Exemplary Embodiment

Explanation will now be given of the light distribution control of a first exemplary embodiment of the present invention. In the present exemplary embodiment, the luminance point of an oncoming vehicle is detected, and control of the light distribution is preformed so that, from within the light distribution regions of the front light 12, the segmented region 22 that corresponds to the oncoming vehicle is made non illuminating. However, when detecting the luminance point of the oncoming vehicle, if a luminance point from the front light 12 of the vehicle itself is detected in reflected light that has been reflected by a road surface, a mirror on the road, a guard rail, the car in front or the like, then sometimes it is not possible to determine accurately the luminance point of the oncoming vehicle. In such a case, when illuminating the light from the front light 12 of the vehicle, irradiation is made incorporating a light signal, then luminance point(s) with the light signal are excluded, and the luminance point of the oncoming vehicle is thereby detected.

Namely, in the present exemplary embodiment, when illuminating the front light 12, a predetermined light signal is irradiated by the front light driver 20 driving modulation of plural LED light sources 24 (all or a portion of the LED light sources 24). Then the light distribution control ECU 14 detects the light signal on the bases of the captured image that has been captured by the camera 18. By so doing, when a luminance point has been detected that includes the light signal, then it is known that it comes from reflected light of light that has been irradiated from the front light 12 of the vehicle itself, and by excluding this luminance point when detecting the luminance point of the oncoming vehicle, accurate detection of the oncoming vehicle may be made.

Figure 5:
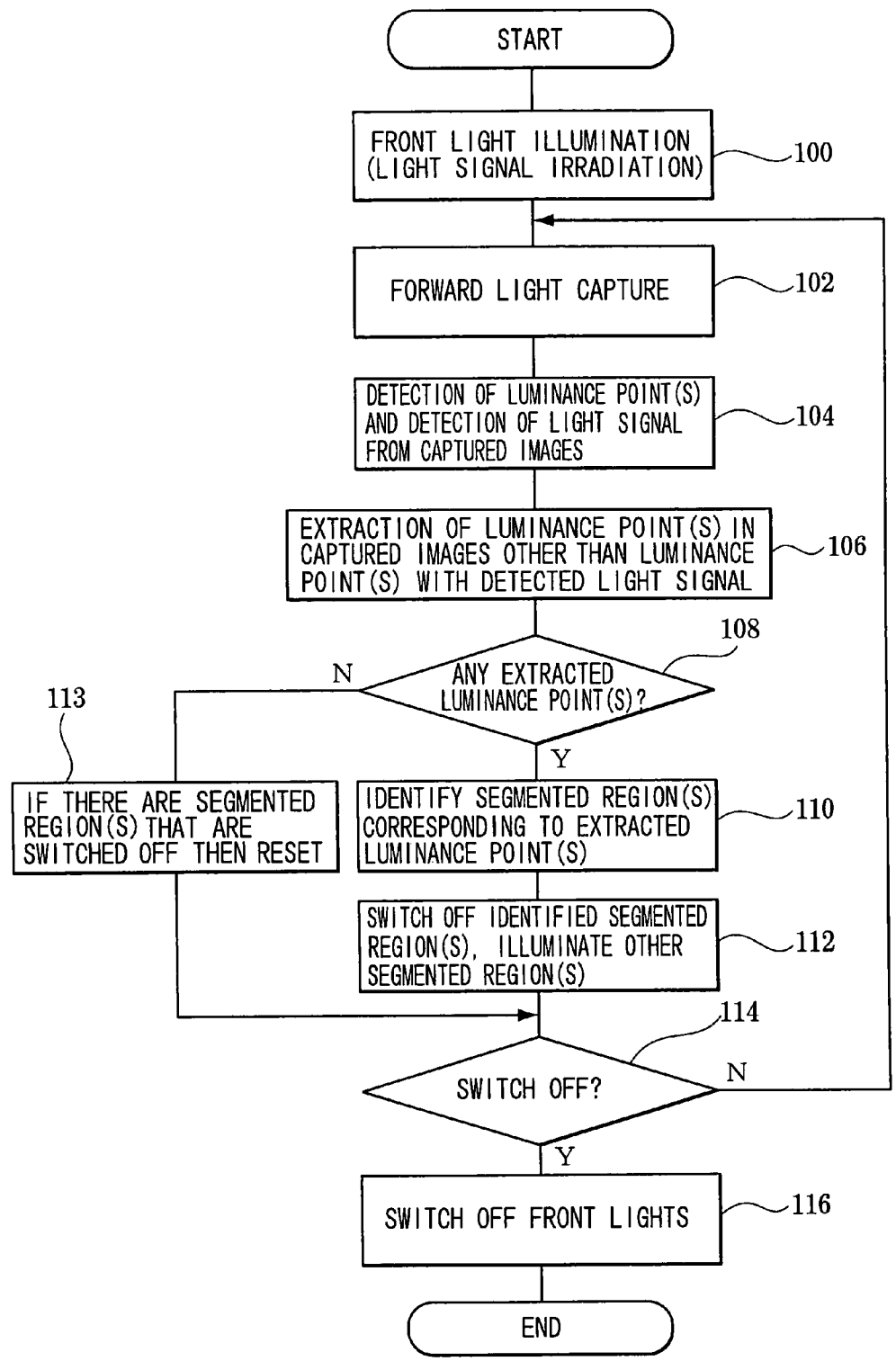
FIG. 5 is a flow chart showing a light distribution control routine carried out in a light distribution control ECU of a vehicle illumination device according to a first exemplary embodiment of the present invention.

Explanation will now be given of details of light distribution control carried out by the light distribution control ECU 14 of the vehicle illumination device 10 according to the first exemplary embodiment of the present invention. FIG. 5 is a flow chart showing a light distribution control routine carried out in the light distribution control ECU 14 of the vehicle illumination device 10 according to an exemplary embodiment of the present invention. It should be noted that the light distribution routine shown in FIG. 5 is initiated by operation of the driver switch 16, when illumination of the front light 12 is instructed, or the like. It may also be configured such that there is an automatic illumination mode provided to the switch 16, and, when the driver instructs the automatic illumination mode, then the front light 12 is illuminated when predetermined condition(s) have been met.

When illumination of the front light 12 is instructed by operation of the driver switch 16, the front light 12 is illuminated at step 100. Namely, by the CPU 14A controlling the front light driver 20 through the I/O 14D, each of the LED light sources 24 of the two front lights 12 are driven, and the front light 12 is illuminated. When this happens, the front light driver 20 also modulates all, or a portion of, the plural LED light sources 24 of the front light 12 and a predetermined light signal is output.

At step 102, the captured result that has been captured by the camera 18 in the vehicle front direction, is acquired by the light distribution control ECU 14 through the I/O 14D, and the routine moves to step 104.

At step 104, the luminance point(s) from the captured image of the camera 18 are identified, and also detection is made for the light signal, Namely, since, from within the luminance point(s) included in the captured image of the camera 18, the luminance point(s) that are reflected light from light that has been irradiated from the vehicle itself are luminance points that include the light signal, whether or not a luminance point in the captured images is a luminance point that corresponds to reflected light from light that has been irradiated from the vehicle itself may be determined by CPU 14A detecting for the light signal in the captured images.

Next, at step 106, the luminance point(s) from the captured image of the camera 18, other than the luminance point(s) that have/has been detected with the light signal, are extracted. Namely, the luminance point(s) of the oncoming vehicle may be detected by extracting the luminance point(s) which are other than the luminance point(s) from which the light signal has been detected by the CPU 14A.

At step 108, the CPU 14A determines whether or not there are any luminance point(s) that have been extracted at step 106, and when determined negative then the routine moves to step 113, and when positive the routine moves to step 110.

At step 110, the segmented regions of the front lights 12 that correspond to the extracted luminance point(s) are identified by the CPU 14A, and the routine proceeds to step 112.

In step 112, the segmented region(s) 22 that have been identified are switched off, and the segmented regions other than these region(s) are illuminated, and the routine proceeds to step 114. Namely, since the segmented region(s) 22 corresponding to the oncoming vehicle are switched off, glare light to the oncoming vehicle may be suppressed.

At step 113, the light distribution is reset. Namely, as there are cases in which light distribution control is carried out, and segmented regions are switched off, then by resetting the light distribution control, all of the segmented regions are illuminated and the routine proceeds to step 114.

Then, at step 114, whether or not the driver switch 16 is switched off is determined by the CPU 14A, and when determined negative, the routine returns to step 102, and the procedures described above are carried out over again, but when it is determined positive at step 114 then the routine proceeds to step 116, the front lights 12 are switched off and one sequence of the processing is completed.

Figure 6:
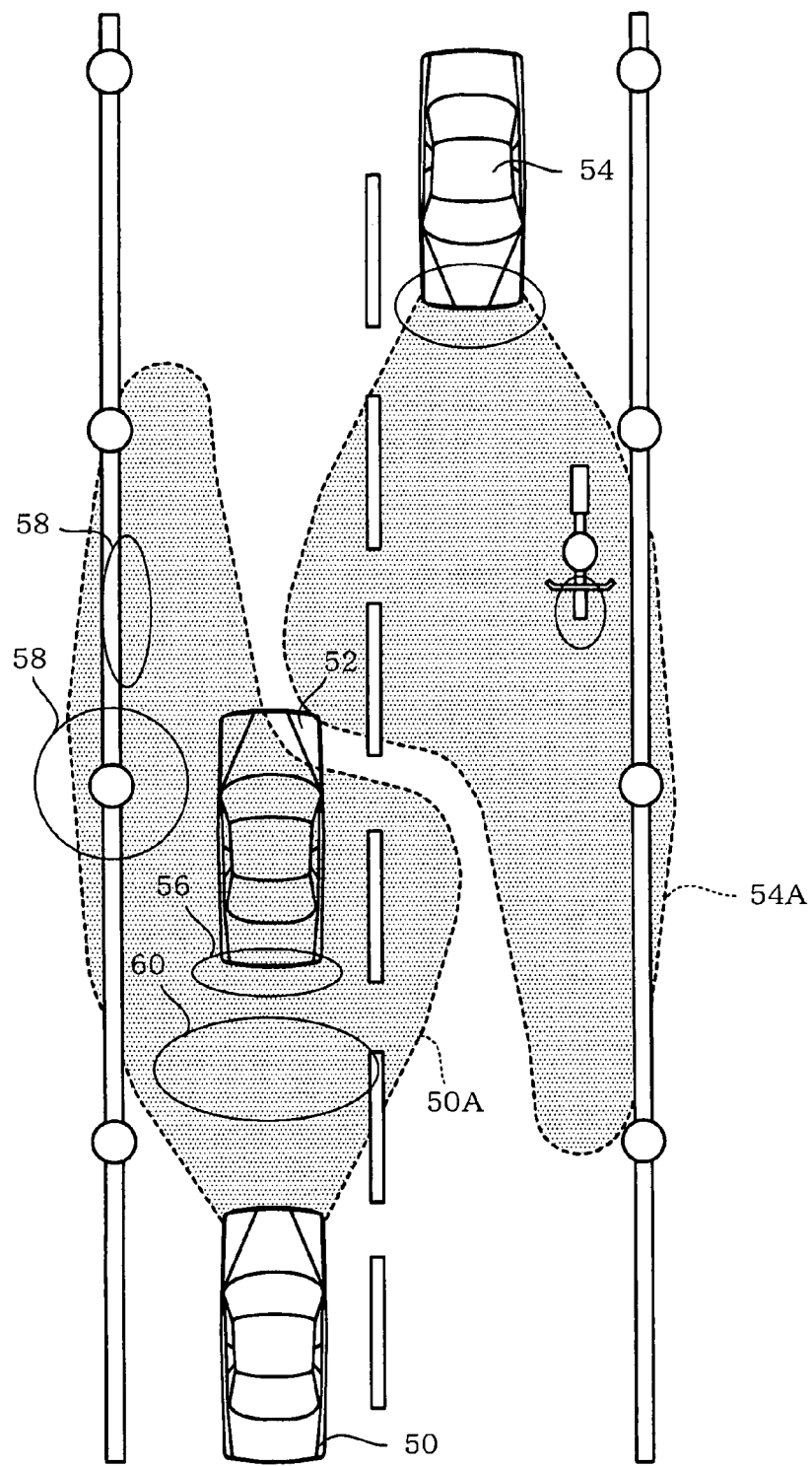
FIG. 6 is a diagram for explaining light distribution control in various exemplary embodiments of the present invention.

In the present exemplary embodiment, the luminance points are detected from the captured image of the camera 18, and light distribution control is carried out so that the glare light to an oncoming vehicle is suppressed by not irradiating the segmented region(s) 22 of the front lights 12 that correspond to the oncoming vehicle, however, as shown in FIG. 6, when there is a car in front 52 and oncoming vehicles (including a motor bike) 54, if there is a light distribution region 50A of the vehicle itself 50 and a light distribution region 54A of the oncoming vehicles 54, then plural luminance points are detected from the captured image of the camera 18, and in the plural detected luminance points there are: luminance point (s) 56 that correspond to reflected light of light irradiated from the front light 12 of the vehicle itself 50 that has been reflected back from the car in front 52; and luminance point(s) 58 that correspond to reflected light of light reflected from mirrors on the road, guard rails, reflective mirrors, and the like; and luminance point(s) 60 that correspond to reflected light of that has been reflected from the road surface. Therefore, if simply the luminance points are extracted then the luminance point (s) of the oncoming vehicle 54 cannot be extracted therefrom. To address this, by including a light signal in the light irradiated from the front light 12 of the vehicle itself, since the luminance point of the oncoming vehicle do not include such a light signal, the luminance point(s) of the oncoming vehicle may be extracted with certainty, by extracting the luminance points that do not include the light signal and, thus, light distribution control in response to the light being irradiated from the vehicle itself can be prevented.

Furthermore, in the present exemplary embodiment, since the LED light sources 24 of the front lights 12 are controlled and a light signal irradiated, light modulation is easily carried out by using the LED light sources 24. Also, such a configuration is beneficial from the perspectives of cost and mounting area, when compared to a case in which an irradiation unit for irradiating a light signal is provided as a separate body from the front lights 12.

Second Exemplary Embodiment

Explanation will now be given of light distribution control of a second exemplary embodiment of the present invention. In the first exemplary embodiment the light signal was included in the light irradiated from the front light 12 of the vehicle itself, however, the present exemplary embodiment is a configuration in which there is switching between illumination states from the front lights 12 of the vehicle itself, and by extracting the luminance point(s) that are other than the luminance point(s) that match the switching of the illumination states (for example, with the same switching timing), the luminance point(s) of an oncoming vehicle are detected. Specifically, it is configured such that a portion of the LED light sources 24 of the front light 12 of the vehicle itself are switched off for a moment, and the luminance point(s) of the oncoming vehicle are detected by extracting the luminance point(s) that are not luminance point(s) that are switched off and back on again with the same timing. Namely, in the first exemplary embodiment the illumination of the front light 12 is controlled by the front light driver 20 such that a light signal is output, but in the present exemplary embodiment the front light driver 20 is simply controlled for illumination and switching off, so that the illumination state is thereby switched.

In the present exemplary embodiment, the portion of the plural LED light sources 24 of the front light 12 that is switched in illumination states is a number of LED light sources 24 that is sufficient to be detectable by the camera 18.

Figure 7:
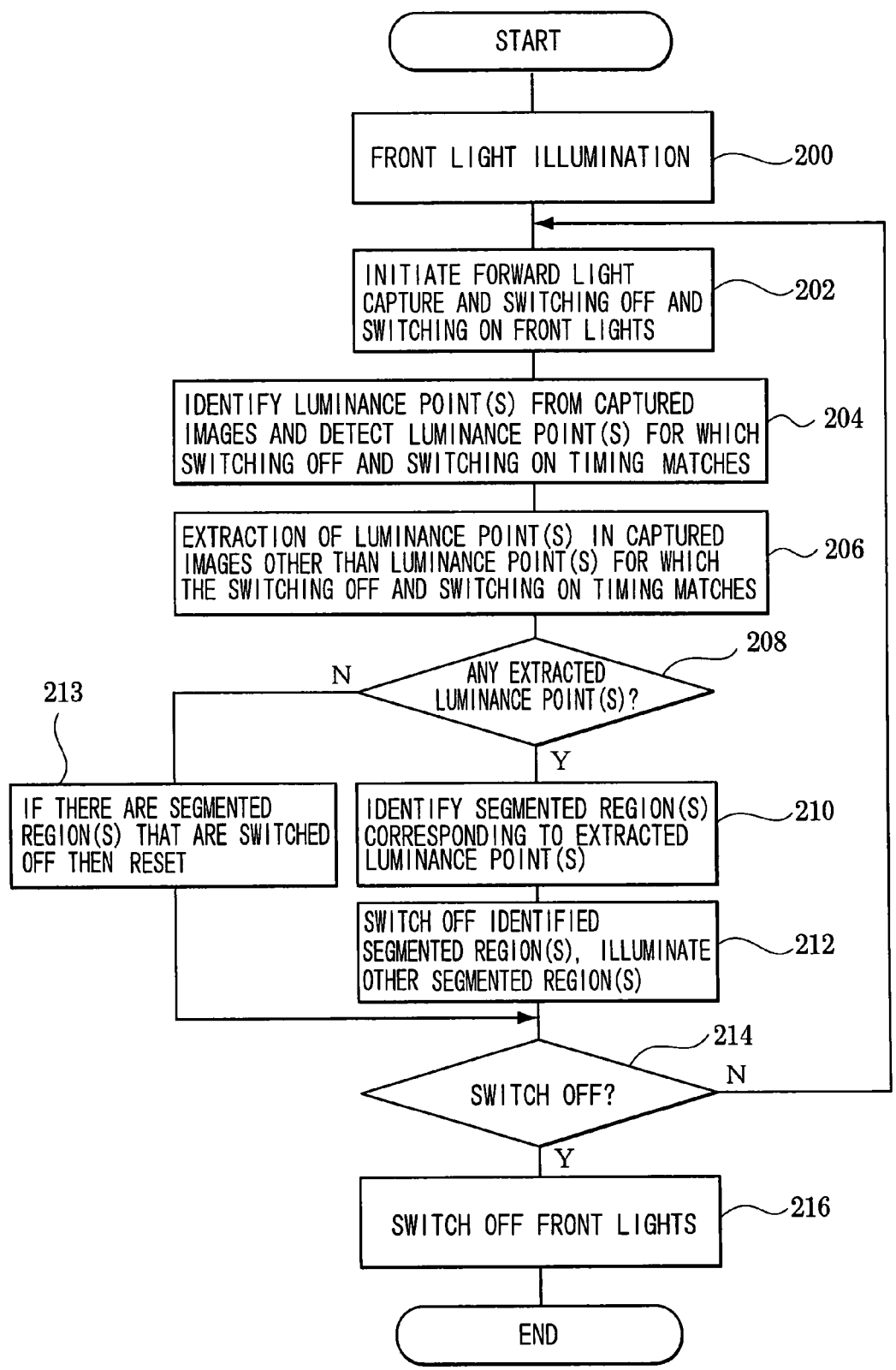
FIG. 7 is a flow chart showing a light distribution control routine carried out in a light distribution control ECU of a vehicle illumination device according to a second exemplary embodiment of the present invention.

FIG. 7 is a flow chart showing a light distribution control routine carried out in the light distribution control ECU 14 of the vehicle illumination device according to the second exemplary embodiment of the present invention. It should be noted that in the same manner as in the light distribution control routine of the first exemplary embodiment, the illumination of the front light 12 is initiated when instructed by operation of the driver switch 16 or the like. Furthermore, it may be configured such that there is an automatic illumination mode provided to the switch 16, and, when the driver instructs the automatic illumination mode, then the front light 12 may be illuminated when predetermined condition(s) have been met.

When illumination of the front light 12 is instructed by the operation of the driver switch 16, at step 200, the front light 12 is illuminated. Namely, the LED light sources 24 in each of the two front lights 12 are driven, by the CPU 14A controlling the front light driver 20 through the I/O 14D, and the front lights 12 are illuminated.

At step 202, capturing is started in the vehicle front direction with the camera 18 and a portion of the plural LED light sources 24 in the front lights 12 are switched off and then illuminated, and the routine proceeds to step 204. Namely, captured images that include the switching off and illumination of the front light 12 are acquired by the light distribution control ECU 14 through the I/O 14D.

At step 204, luminance point(s) are identified in the captured images from the camera 18, and luminance point(s) that have a switching off and illumination timing that match are detected. Namely, since, from within the luminance point(s) included in the captured images of the camera 18, the luminance point(s) that are of reflected light from light that has been irradiated from the vehicle itself are switched off and re-illuminated, the switching off and re-illumination timing matches with that of the switching off and re-illumination of the light from the vehicle itself, and, by the CPU 14A detecting this match, it may be determined whether or not a luminance point is one of the luminance point(s) in the captured images that corresponds to reflected light from light that has been irradiated from the vehicle itself.

Next, in step 206, the luminance point(s) from the captured images of the camera 18 are extracted by the CPU 14A that are not luminance point(s) that have a switching off and re-illumination timing that matches that of the front lights 12 of the vehicle itself.

At step 208, the CPU 14A determines whether or not there are luminance point(s) that have been extracted at step 206, and when it has been determined negative the routine proceeds to step 213, and when positive the routine proceeds to step 210.

At step 210, the segmented regions of the front lights 12 that correspond to the luminance point(s) that have been extracted are identified by the CPU 14A, and the routine proceeds to step 212.

At step 212 the identified segmented region(s) 22 are switched off, and segmented regions other than those are illuminated, and the routine proceeds to step 214. Namely, since the segmented region(s) 22 that correspond to the oncoming vehicle are switched off, glare light to the oncoming vehicle may be suppressed.

At step 213, the light distribution is reset. Namely, light distribution control is carried out and there are occasions when there are segmented regions that are switched off, and by resetting the light distribution control, all of the segmented regions are illuminated and the routine proceeds to step 214.

Then, at step 214, whether or not the switch 16 has been switched off is determined by the CPU 14A, and when determined negative, then the routine returns to step 202 and the processes that have been described above are carried out again, and when determination at step 214 becomes positive, then the routine proceeds to step 216, and the front lights 12 are switched off and one sequence of processing is completed.

In the present exemplary embodiment, the luminance points are detected from the captured images of the 18, and segmented region(s) 22 of the front lights 12 that correspond to an oncoming vehicle are made non-illuminating, and light distribution control is carried out such that glare light is suppressed to the oncoming vehicle. However, for example, as shown in FIG. 6, when there is a car in front 52 and oncoming vehicles (including motor bikes) 54, if there is a light distribution region 50A of the vehicle itself 50 and a light distribution region 54A of the oncoming vehicles 54, then plural luminance points are detected from the captured image of the camera 18, and in the plural detected luminance points there are: luminance point(s) 56 that correspond to reflected light of light that has been irradiated from the front light 12 of the vehicle itself 50 and reflected back from the car in front 52; and luminance point(s) 58 that correspond to reflected light of light reflected from mirrors on the road, guard rails, reflective mirrors, and the like; and luminance point(s) 60 that correspond to reflected light that is reflected from the road surface. Therefore, if simply the luminance points are extracted then the luminance point(s) of the oncoming vehicles 54 cannot be extracted therefrom. To address this, the front lights 12 of the vehicle itself are switched off and re-illuminated. By so doing, by extracting the luminance point (s) from the luminance point(s) in the captured images other than those with a switching off and re-illumination timing that match, the luminance point(s) of an oncoming vehicle may be detected with certainty, and light distribution control in response to light that has been irradiated from the vehicle itself may be prevented.

Furthermore, since it is configured such that illumination states are switched by carrying out switching off and re-illumination of a portion of the plural LED light sources 24 of the front light 12, there is no change made to the illumination states of the other LED light sources 24, and trouble caused by switching the illumination states (such as, for example, lowering visibility by switching off) may be reduced.

It should be noted that that combinations may also be made of the second exemplary embodiment and the first exemplary embodiment. By doing so, even if there are vehicles other than the vehicle itself that are irradiating light signals, by detecting whether the switching off and re-illumination timing of the light matches it is possible to detect the luminance point(s) of the vehicle itself, and the luminance point(s) of oncoming vehicles may be detected with certainty.

Furthermore, in the second exemplary embodiment it was configured such that the illumination states were switched by switching off and re-illuminating a portion of the LED light sources 24 of the front lights 12 of the vehicle itself, however, there is no limitation thereto, and, for example: all of the LED light sources 24 of the front lights 12 may be switched off for a period of time that is of the order that is not visible to the human eye, but that may be detected by a camera 18; or, the illumination states may be switched by swinging to the left or right, and the luminance point(s) from the vehicle itself detected by detecting whether or not the swing timing matches.

Third Exemplary Embodiment

Explanation will next be given of light distribution control according to a third exemplary embodiment of the present invention. In the first exemplary embodiment explanation was given under the proviso that the only vehicle that irradiates a light signal was the vehicle itself, however, in the third exemplary embodiment, explanation will be given of another case where other vehicles are also irradiating light signals.

In the present exemplary embodiment it is configured such that when the front lights 12 are illuminated, a predetermined light signal is irradiated by the front light driver 20 driving so as to modulate plural LED light sources 24 (all of, or a portion of, the LED light sources 24). When this happens, in the present exemplary embodiment, as the light signal, a light signal is irradiated that is an identification signal for identifying the vehicle itself. Then, the light distribution control ECU 14 is configured so as to detect the light signal based on the captured images that have been captured by the camera 18. By doing so, when luminance point(s) are detected that include a light signal of the identification signal for the vehicle itself, it is known that the light has been irradiated from the front lights 12 of the vehicle itself, and by excluding these luminance point(s) the luminance point(s) of an oncoming vehicle may be detected, and so accurate detection of an oncoming vehicle may be made.

Figure 8:
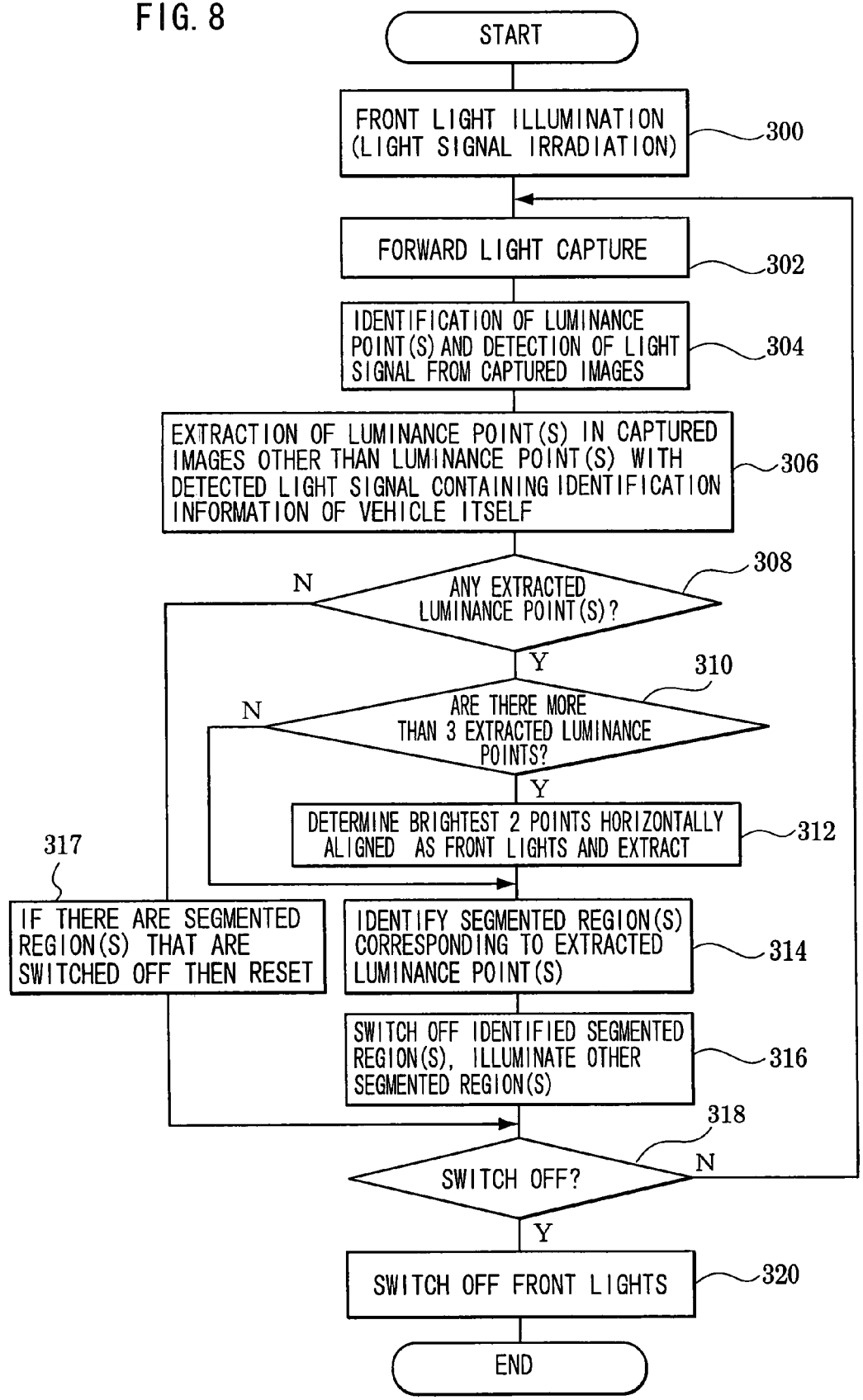
FIG. 8 is a flow chart showing a light distribution control routine carried out in a light distribution control ECU of a vehicle illumination device according to a third exemplary embodiment of the present invention.

FIG. 8 is a flow chart showing a light distribution control routine carried out in the light distribution control ECU 14 of the vehicle illumination device according to the third exemplary embodiment of the present invention. It should be noted that in the same manner as in the light distribution control routine of the first exemplary embodiment, the illumination of the front light 12 is initiated when instructed by operation of the driver switch 16 or the like. Furthermore, it may be configured such that there is an automatic illumination mode provided to the switch 16, and, when the driver instructs the automatic illumination mode, then the front light 12 is illuminated when predetermined condition(s) have been met.

When illumination of the front light 12 is instructed by the operation of the driver switch 16, at step 300, the front light 12 is illuminated. Namely, the LED light sources 24 in each of the two front lights 12 are driven, by the CPU 14A controlling the front light driver 20 through the I/O 14D, and the front lights 12 are illuminated. Furthermore, when this happens, the front light driver 20, undertakes light modulation of all of, or a portion of, the plural LED light sources 24 of the front lights 12, and irradiates as the light signal an identification signal for identifying the vehicle itself.

In step 302, the capturing result that has been captured in the vehicle front direction by the camera 18 is acquired by the light distribution control ECU 14 through the I/O 14D, and the routine proceeds to step 304.

At step 304, the luminance point(s) are identified from the captured images of the camera 18, and also the light signal is detected. Namely, since, from within the luminance point(s) included in the captured images of the camera 18, the luminance point(s) that are of reflected light from light that has been irradiated from the vehicle itself include the light signal representing the light signal for the vehicle itself, it is possible to determined whether or not the luminance point(s) in the captured images are luminance point(s) that correspond to reflected light of light that has been irradiated from the vehicle itself, by the CPU 14A detecting the light signal representing the light signal of the vehicle itself.

Next, in step 306, luminance point(s) from the captured images of the camera 18 are extracted that are not luminance points for which the light signal has been detected. Namely, by extracting the luminance point(s) other than those that have been detected by the CPU 14A with the light signal representing the identification signal of the vehicle itself, the luminance point(s) of an oncoming vehicle may be detected.

At step 308, the CPU 14A determines whether or not there are luminance point(s) that have been extracted at step 306, and when it has been determined negative the routine proceeds to step 317, and when positive the routine proceeds to step 310.

At step 310, it is determined whether or not there are three or more luminance point(s) that have been extracted by the CPU 14A, and if it has been determined positive then the routine proceeds to step 312, and if negative the routine proceeds to step 314.

At step 312 the brightest two horizontally aligned points are extracted as the luminance points of the oncoming vehicle by the CPU 14A, and the routine proceeds to step 314. For example, when the received light by the camera 18 is light that has been reflected by a mirror on the road or a guardrail or the like, the brightness of the light that has been irradiated from the front lights 12 becomes darker by dispersion and attenuation when spatial migration, and since the brightest light is extracted, the luminance points of an oncoming vehicle may be extracted, with reflected light that is light that has been reflected from the oncoming vehicle excluded therefrom. Furthermore, since the luminance points are the brightest two horizontally aligned points when they are for an oncoming vehicle, and the oncoming vehicle may be detected by extracting these points. It should be noted that in step 310 and step 312 a four wheel vehicle and a two wheel vehicle are both oncoming vehicles that are captured by the camera 18, and so may be omitted. In such a case, it may be configured such that only the brightest luminance point is extracted, or configured such that by including information for a two wheel vehicle or for a four wheel vehicle in the respective light signals, either a two wheel vehicle or a four wheel vehicle may be identified, and when there are 3 or more points with the same light signal then the number of bright luminance point(s) that correspond to either a two wheel vehicle or a four wheel vehicle may be extracted.

Subsequently, at step 314, the segmented regions of the front lights 12 that correspond to the luminance points that have been extracted are identified by the CPU 14A, and the routine proceeds to step 316.

At step 316, the segmented region(s) 22 that have been identified are made non-illuminating, and the other segmented regions are illuminated and the routine proceeds to step 318. Namely, since the segmented region(s) 22 that correspond to an oncoming vehicle are switched off, glare light to an oncoming vehicle may be suppressed.

At step 317 the light distribution is reset. Namely, light distribution control is carried out and there are occasions when there are segmented regions that are switched off, and by resetting the light distribution control, all of the segmented regions are illuminated and the routine proceeds to step 318.

Then, at step 318, whether or not the switch 16 has been switched off is determined by the CPU 14A, and when determined negative, then the routine returns to step 302 and the processes that have been described above are carried out again, and when determination at step 318 becomes positive, then the routine proceeds to step 320, and the front lights 12 are switched off and one sequence of processing is completed.

In the present exemplary embodiment, the luminance points are detected from the captured images of the 18, and segmented region(s) 22 of the front lights 12 that correspond to an oncoming vehicle are made non-illuminating and glare light is suppressed to the oncoming vehicle. However, for example, as shown in FIG. 6, when there is a car in front 52 and an oncoming vehicle 54, if there is a light distribution region 50A of the vehicle itself 50 and a light distribution region 54A of the oncoming vehicles 54, then, plural luminance points are extracted from the captured images of the camera 18, then the plural detected luminance points include: luminance point(s) 56 that correspond to reflected light of light irradiated from the front light 12 of the vehicle itself 50 that is reflected from the rear side of the car in front 52; and luminance point(s) 58 that correspond to reflected light of light reflected from mirrors on the road, guard rails, reflective mirrors, and the like; and luminance point(s) 60 that correspond to reflected light that is reflected from the road surface. Therefore, if simply the luminance points are extracted then the luminance point(s) of an oncoming vehicle cannot be extracted. To address this, a light signal is incorporated in the light irradiated from the front lights 12 of the vehicle itself. Furthermore, consideration has been made to the case in which another vehicle has the same configuration, and the light signal is irradiated including an identification signal that is able to identify the vehicle itself. Since the luminance point(s) from the vehicle itself may be identified in this manner, by extracting the luminance point(s) other than the luminance point(s) of the vehicle itself, an oncoming vehicle may be detected with certainty, and light distribution control in response to light that has been irradiated from the vehicle itself may be prevented.

Also, in the present exemplary embodiment, since in the same way as in the first exemplary embodiment the LED light sources 24 of the front light 12 are controlled and a light signal irradiated, light modulation is easily carried out by using the LED light sources 24. Also, such a configuration is beneficial from the perspectives of cost and mounting area, when compared to a case in which an irradiation unit for irradiating a light signal is provided as a separate body from the front lights 12.

Furthermore, by extracting the two brightest luminance point(s) that are in horizontally aligned, luminance point(s) may be excluded that correspond to reflected light that is light irradiated from the oncoming vehicle that has been reflected by mirrors on the road, guardrails and the like, and light distribution control may be carried out with certainty for an oncoming vehicle.

It should be noted that, in the present exemplary embodiments, there is no particular mention of high-beam or low-beam, however, the light distribution control described above may be carried out only to the high-beam regions, or the above light distribution control may be carried out to the high-beam regions and the low-beam regions, or the above light distribution control may be carried out only to the low-beam regions. When the above light distribution control is carried out to the high-beam regions, driving with continuous high-beam illumination may be enabled.

Furthermore, in each of the above exemplary embodiments, the front light 12 serve as the vehicle illumination unit of the present invention, however there is no limitation thereto and vehicle illumination of the unit may be applied to auxiliary lights or other vehicle lights.

Furthermore, in each of the above exemplary embodiments, explanation has been given of light distribution control for oncoming vehicles in the vehicle front direction, however, there is no limitation thereto, and light distribution control may be carried out for vehicles that are in the periphery of the vehicle, or to pedestrians or the like.

Furthermore, in the light distribution control routine of each of the above exemplary embodiments the processing may be carried out by hardware or the processing may be carried out by software or the like.

Furthermore, the above first exemplary embodiment and third exemplary embodiment LED light sources 24 are used as the light sources for the front lights 12 and it is configured to control the LED light sources 24 so as to irradiate a light signal, however, there is no limitation thereto, and a configuration with a separately provided irradiation unit is also suitable.

Figure 9:
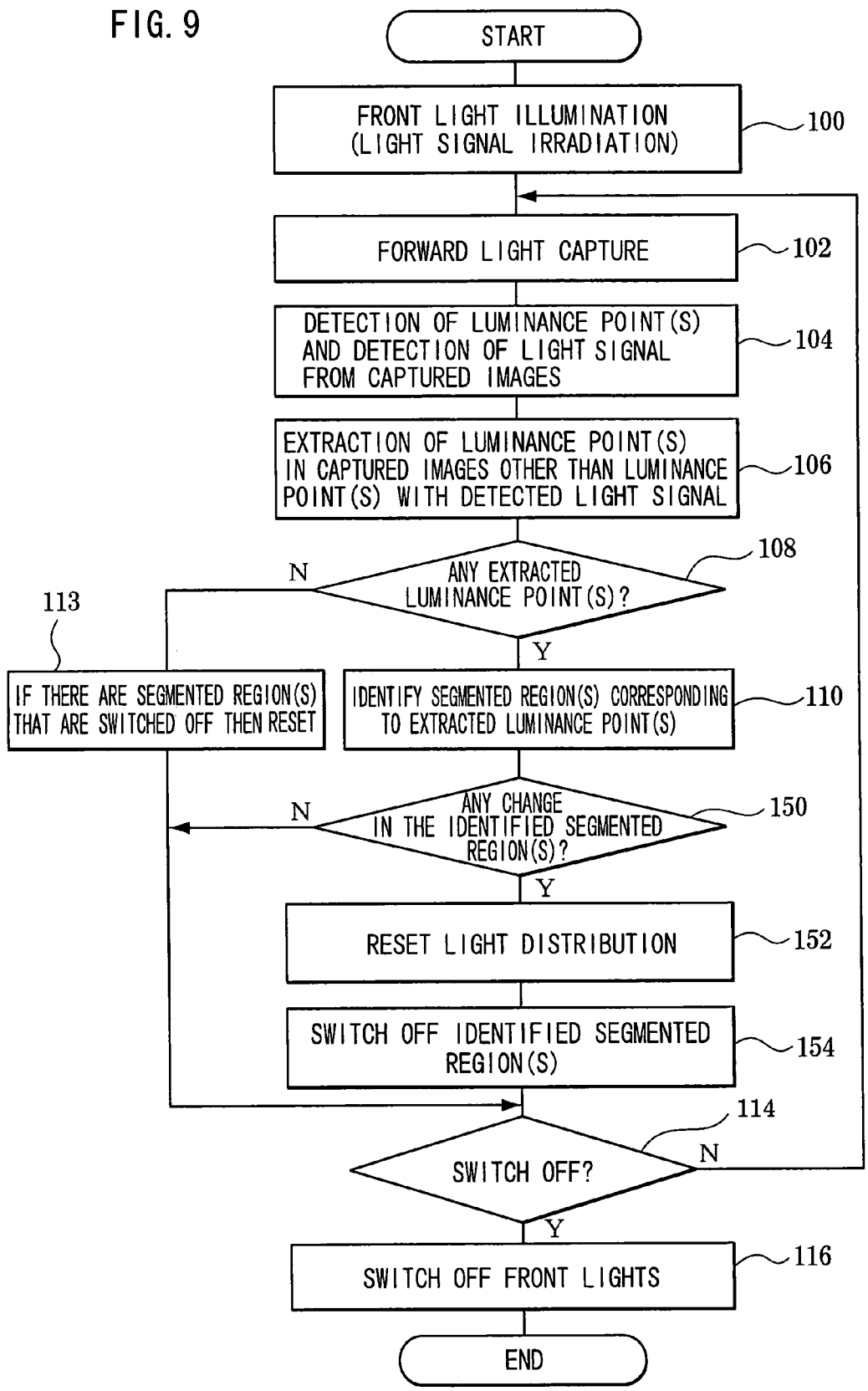
FIG. 9 is a flow chart showing a light distribution control routine carried out in a light distribution control ECU of a vehicle illumination device according to a modification of the first exemplary embodiment of the present invention.

The control routine in each of the above exemplary embodiments may furthermore be provided, by substituting the process for switching off the identified segmented regions and illuminating the other segmented regions (steps 112, 212, 316), with the steps 150 to 154 that are shown in FIG. 9. FIG. 9 shows the light distribution control routine of the first exemplary embodiment in which the step 112 has been substituted with the steps 150 to 154.

Namely, in the step 150 the CPU 14A determines whether or not there has been a change to the identified segmented region(s), and if the determination is positive then the routine proceeds to step 152, but if negative then the routine proceeds to step 114. It should be noted that in the initial state, since there are no identified segmented regions, this determination is positive.

Furthermore, in step 152, the light distribution is reset. Namely, all of the segmented regions are illuminated, the routine proceeds to step 154, and after the identified segmented region(s) are switched off, the routine proceeds to step 114.

What is claimed is:

1. A vehicle illumination device comprising:
a vehicle illumination unit having a light distribution that can be modified with respect to each of plural divided regions into which the light distribution region is divided;
a light receiving unit that receives light from a vehicle's surroundings;
a determination unit that determines, on the basis of the results of the light received by the light receiving unit, whether or not the received light is reflected light from light that has been irradiated from the vehicle illumination unit; and
a controller that controls the light distribution of the vehicle illumination unit such that when a determination has been made by the determination unit that the light is not reflected light from light that has been irradiated from the vehicle illumination unit, light that is irradiated from the vehicle illumination unit toward a divided region corresponding to the light received by the light receiving unit is either reduced or made non-illuminating.

2. The vehicle illumination device of claim 1, wherein the determination unit comprises an irradiation unit that generates a predetermined light signal, and the determination made by the determination unit as to whether or not the light is reflected light from light that has been irradiated from the vehicle illumination unit is made by detecting the light signal that has been irradiated by the irradiation unit based on the results of the light received by the light receiving unit.

3. The vehicle illumination device of claim 2, wherein a light source of the vehicle illumination unit comprises LED light sources and the irradiation unit irradiates the light signal by controlling driving of the LED light sources.

4. The vehicle illumination device of claim 1, wherein the determination unit comprises a switching section that switches an illumination state of the vehicle illumination unit, and the determination as to whether or not the light is reflected light from light that has been irradiated from the vehicle illumination unit is made by detecting the illumination state that has been switched by the switching section based on the results of the light received by the light receiving unit.

5. The vehicle illumination device of claim 4, wherein the vehicle illumination unit comprises a plurality of light sources, and the switching section switches the illumination state of a portion of the light sources in the plurality of light sources.

6. The vehicle illumination device of claim 1, wherein the controller comprises:
   a luminance point identification section that identifies luminance point(s) on the basis of the results of the light received by the light receiving unit; and
   a luminance point extraction section, that, on the basis of the results of the determination by the determination unit, extracts the luminance point(s) that have been identified by the luminance point identification section that are other than the luminance point(s) corresponding to reflected light from the light that has been irradiated from the vehicle illumination unit, wherein the light distribution of the vehicle illumination unit is controlled such that light is irradiated toward a divided region corresponding to the luminance point(s) extracted by the luminance point extraction section is reduced or made non-illuminating.

7. The vehicle illumination device of claim 6, wherein the controller controls the light distribution of the vehicle illumination unit such that, when there are a plurality of luminance points that have been extracted by the luminance point extraction section, light that is irradiated toward a divided region corresponding to the brightest luminance point thereof is reduced or made non-illuminating.

8. The vehicle illumination device of claim 6, wherein the controller controls the light distribution of the vehicle illumination unit such that, when there are a plurality of luminance points that have been extracted by the luminance point extraction section, light that is irradiated toward a divided region corresponding to the brightest two horizontally aligned luminance points thereof is reduced or made non-illuminating.

9. A vehicle illumination control method comprising:
   a light receiving step of receiving light from a vehicle's surroundings;
   a determination step of determining, on the basis of the results of the received light at the light receiving step, whether or not the light received is reflected light from light that has been irradiated from an illumination unit of the vehicle, the illumination unit having a light distribution that can be modified with respect to each of plural divided regions into which the light distribution region is divided; and
   a controlling step of controlling the light distribution of the vehicle illumination unit such that when at the determination step the determination has been made by a determination unit that the light that has been received is not reflected light from the light that has been irradiated from the vehicle illumination unit, light that is irradiated toward a divided region corresponding to the received light at the light receiving step is either reduced or made non-illuminating.

* * * * *